United States Patent
Kostkin

(10) Patent No.: US 12,263,800 B2
(45) Date of Patent: Apr. 1, 2025

(54) VEHICLE PROTECTION DEVICE

(71) Applicant: PEK AUTOMOTIVE D.O.O., Vrhnika (SI)

(72) Inventor: Mikhail Kostkin, Vrhnika (SI)

(73) Assignee: PEK AUTOMOTIVE D.O.O., Logatec (SI)

( * ) Notice: Subject to any disclaimer, the term of this patent is extended or adjusted under 35 U.S.C. 154(b) by 97 days.

(21) Appl. No.: 17/922,364

(22) PCT Filed: May 1, 2020

(86) PCT No.: PCT/IB2020/000275
§ 371 (c)(1),
(2) Date: Oct. 30, 2022

(87) PCT Pub. No.: WO2021/220023
PCT Pub. Date: Nov. 4, 2021

(65) Prior Publication Data
US 2023/0174009 A1  Jun. 8, 2023

(51) Int. Cl.
*B60R 19/46* (2006.01)
*B60R 21/34* (2011.01)

(52) U.S. Cl.
CPC .............. *B60R 19/46* (2013.01); *B60R 21/34* (2013.01)

(58) Field of Classification Search
CPC ......... B60R 19/44; B60R 19/46; B60R 19/48; B60R 21/34; B60R 2021/0076
(Continued)

(56) References Cited

U.S. PATENT DOCUMENTS

| 1,378,988 A | 5/1921 | John |
| 3,782,766 A * | 1/1974 | Teel .................. B60R 19/02 49/34 |

(Continued)

FOREIGN PATENT DOCUMENTS

| CN | 205202931 U | 5/2016 |
| DE | 10141139 C1 | 7/2002 |

(Continued)

OTHER PUBLICATIONS

International Search Report issued by ISA/EPO and mailed on Nov. 20, 2020.
Written Opinion of the ISA/EPO.

*Primary Examiner* — Jason S Daniels
(74) *Attorney, Agent, or Firm* — Patentbar International

(57) ABSTRACT

Protection devices provide operational safety for vehicles. The efficiency of a safety device is enhanced by improving operational reliability in frontal and lateral collisions and simplicity of restoring its structural integrity after collision. A vehicle protection device has a base, and a barrier located in front of the base and fastened to the base by at least two struts having one end attached to the barrier and the other end to the base. Each strut has at least two separate rod-shaped elements featuring holes along their longitudinal axes; and containing detachable joints at their ends; the elements can stay connected with each other by a flexible element passing through the holes of all rod-shaped elements. The struts can be mutually disconnected under axial or lateral load. The flexible element is configured to interact with a base-mounted mechanism for activating the sensor of the vehicle stopping system.

8 Claims, 3 Drawing Sheets

(58) Field of Classification Search
USPC .................................................. 296/124, 142
See application file for complete search history.

(56) References Cited

U.S. PATENT DOCUMENTS

| | | | |
|---|---|---|---|
| 10,625,697 B2* | 4/2020 | Frederick | ................ B60R 19/52 |
| 2010/0283272 A1* | 11/2010 | Schneider | ............... B60R 19/54 |
| | | | 293/115 |

FOREIGN PATENT DOCUMENTS

| | | |
|---|---|---|
| EP | 0168753 A1 | 1/1986 |
| EP | 0192940 A1 | 9/1986 |
| GB | 239142 A | 9/1925 |

* cited by examiner

VEHICLE PROTECTION DEVICE

RELATED APPLICATIONS

This application is a U.S. National Stage Application of International Patent Application PCT/IB2020/000275 filed on May 1, 2020 which is incorporated herein by reference in its entirety.

FIELD OF THE INVENTION

The invention relates to protection devices providing operational safety for vehicles, mainly of agricultural purpose.

BACKGROUND OF THE INVENTION

Various designs of vehicle protection devices are known, which protect humans from the effects of collision.

Patent GB-239142, publication date 1925-09-03, is known, which discloses a car-mounted protection device. The device contains an elastic horizontal element protecting car occupants at collision.

U.S. Pat. No. 1,378,988, publication date May 24, 1921, discloses a protection device comprising a protective casing made of a plurality of plates connected to the vehicle frame by means of a sliding section of latticed blocks.

Each of the above devices is designed to reduce the impact of the vehicle interior on its occupants at collision.

Also known from utility model patent CN205202931, publication date May 4, 2016, is a bumper structure, which contains a barrier in front of the bumper base. In this embodiment, the barrier has a cavity housing prestressed elastic elements.

A safety device for an agricultural machine is also known from patent DE10141139, publication date Jul. 18, 2002. The device contains a protective shell installed in front of the machine and connected to a switch, which is activated at collision. The switch is connected with the engine ignition circuit or drive couplings of the vehicle.

The above design is the closest analog to the case in point.

SUMMARY OF THE INVENTION

The technical result achieved through the invention consists of enhancing the efficiency of safety device due to an improved reliability of its operation in frontal and lateral collisions and the simplicity of restoring structural integrity after collision.

The vehicle protection device includes a base, and a barrier located in front of the base and fastened thereto by means of at least two struts having one end attached to the barrier and the other end to the base. Each of the struts is made of at least two separate rod-shaped elements featuring holes along their longitudinal axes, and containing detachable joints at their ends; said elements are configured to enable them to stay connected with each other by means of a flexible element passing through the holes of all rod-shaped elements of the struts. The struts are also configured to make their mutual disconnection possible under axial or lateral load. Moreover, said flexible element is configured to enable its interaction with a base-mounted mechanism, which activates the sensor of the vehicle stopping system.

The protection device is triggered by a frontal and lateral impact dealt upon the barrier as a result of collision with an obstacle. At collision, the rod-shaped elements of at least one strut get disconnected, the strut loses its structural integrity and the flexible element gets displaced. Therein, the vehicle stopping system sensor is activated. The vehicle stops. After the impact of the obstacle is eliminated, the rod-shaped elements of the struts connect with each other, thus pulling the flexible element and restoring the integrity of the protection device.

Moreover, the base has a fastener for connecting it to the vehicle.

In a particular embodiment, the detachable joint is pivot-hinged.

In this case, two struts are located in the same plane, with the upper strut attached to the upper part of the barrier on one side and to the upper part of the base on the other side.

Further, the barrier is situated below the planes, in which the attachment points of said struts with the base lie.

More particularly, the flexible element can be made in the form of a cable.

Also, the flexible element can be made in the form of a cord.

Further, the protection device is adapted for attaching to a vehicle.

DETAILED DESCRIPTION OF THE PREFERRED EMBODIMENTS

Embodiments of the Invention

The protection device is primarily intended for agricultural vehicles. It can be mounted in front of the vehicle, or in front of the mechanism attached to the vehicle.

Figure 1:
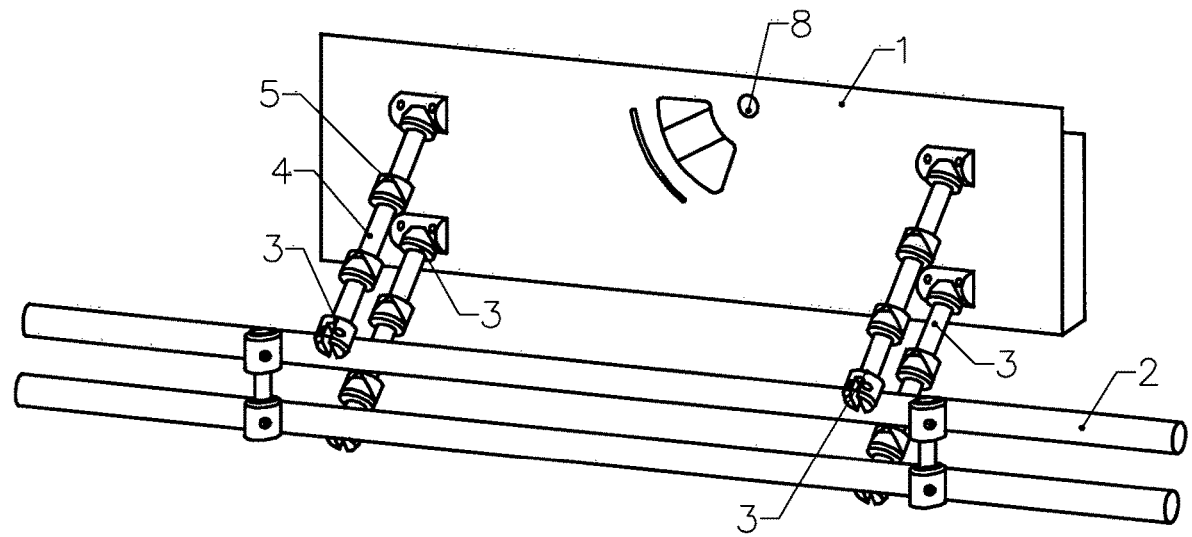
FIG. 1 shows a general view of the protection device.

The protection device includes base 1 and barrier 2 located in front of base 1 (FIG. 1). Barrier 2 can be made in the form of rods or tubes or from sheet material. Barrier 2 is attached to base 1 by means of at least two struts 3. FIG. 1-FIG. 6 show an embodiment of the protective device with four struts 3. In this embodiment, each pair of struts 3 is situated in the same plane (FIG. 3) and is attached to base 1 and barrier 2. Upper strut 3 is attached to the upper part of barrier 2 with one end and to the upper part of base 1 with the other end. Barrier 2 is located below the planes, in which the attachment points of struts 3 with base 1 lie. In this design, struts 3 in combination with barrier 2 form, in geometrical aspect, a sufficiently stable structure.

Each of struts 3 (FIG. 3) is made of at least two separate rod-shaped elements 4 with holes 13 along the longitudinal axes of elements 4. The ends of elements 4 have detachable joints 5, for example, detachable pivot hinges. Struts 3 consisting of detachable rod-shaped elements 4 are fastened together into an integral unit, in this embodiment, by means of one flexible element 6, which passes through holes 13 of all rod-shaped elements 4, while the elements of barrier 2 and the ends of tightened flexible element 6 are fixed on base 1 by means of elements 12. To guide flexible element 6, a row of guide pulleys 11 is fixed on the base. A cable, a cord, particularly a plastic cord, can be used as flexible element 6. Examples of securing flexible element 6 to the base are given in FIG. 2 and FIG. 5.

Figure 2:
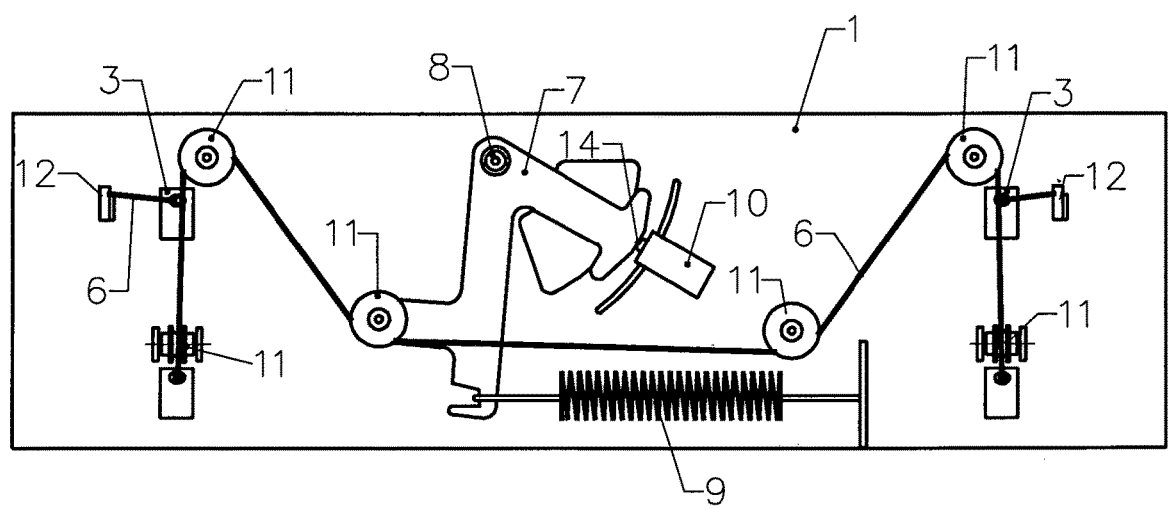
FIG. 2 shows a rear view of the base of the support structure.
Figure 3:
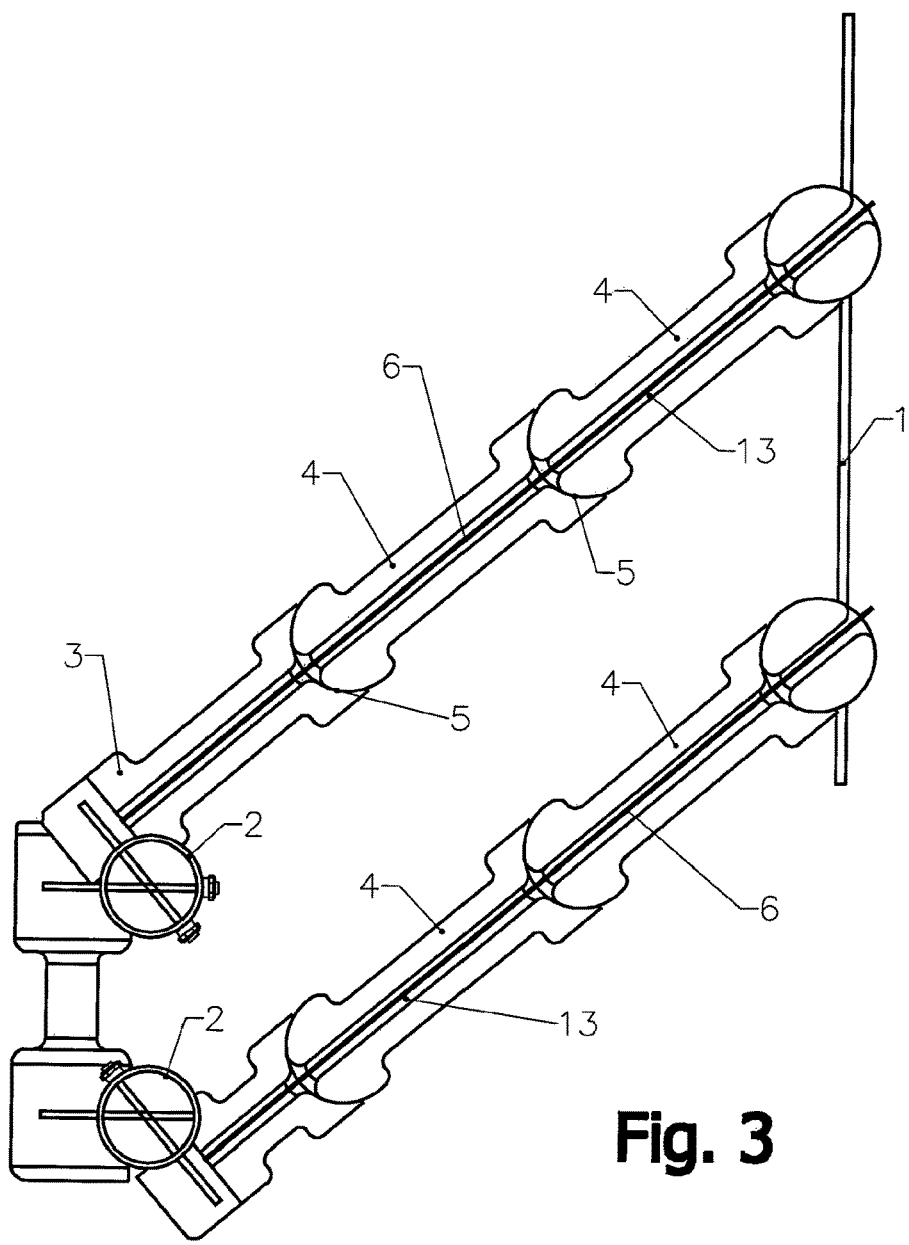
FIG. 3 shows a sectional side view of the struts of the protection device.
Figure 4:
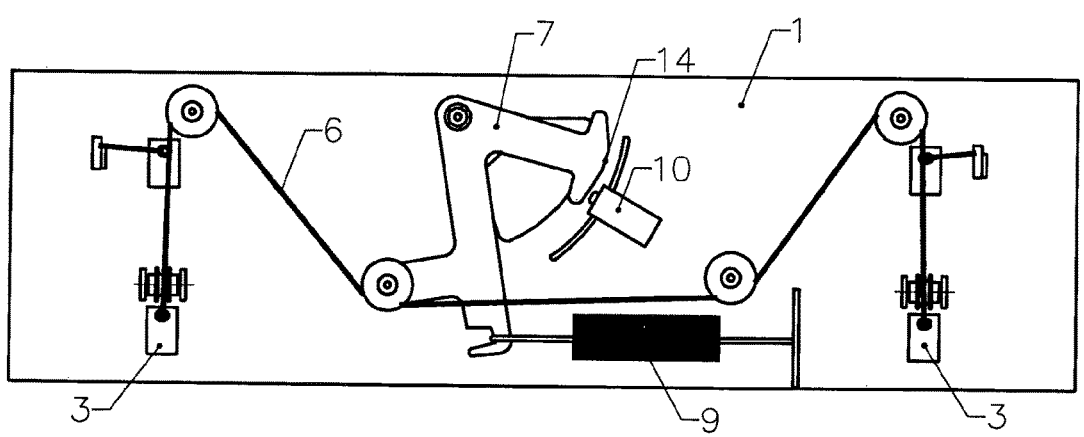
FIG. 4 shows a rear view of the base of the support structure after a collision with an obstacle.

FIG. 2 and FIG. 4 show an embodiment of a mechanism for activating sensor 10 of the vehicle stopping system located on base 1. The mechanism for activating sensor 10 consists of rocker 7 mounted on axle 8. Rocker 7 has guide pulley 11 interacting with flexible element 6. One end of spring 9 is attached to one arm of rocker 7, while the other spring end is fixed to base 1. The other arm of rocker 7 carries signal element 14 of sensor 10 of the vehicle stopping system mounted on base 1. Flexible element 6 goes through all struts 3, barrier 2 and base 1. Sensor 10 may be represented by a magnetic or optical sensor, or another device appropriate for detecting the displacement of flexible member 6.

Figure 5:
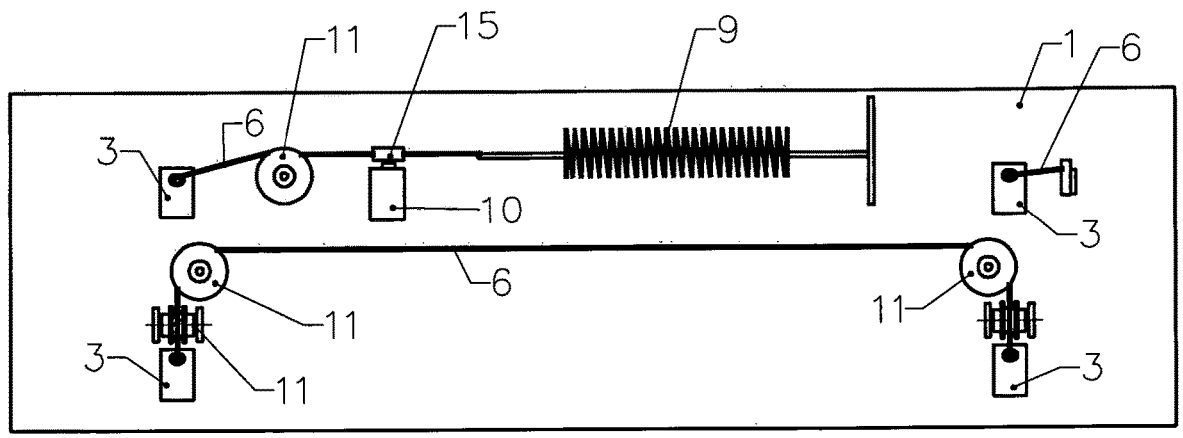
FIG. 5 shows another embodiment of the base equipped with a mechanism for activating a vehicle stopping sensor.
Figure 6:
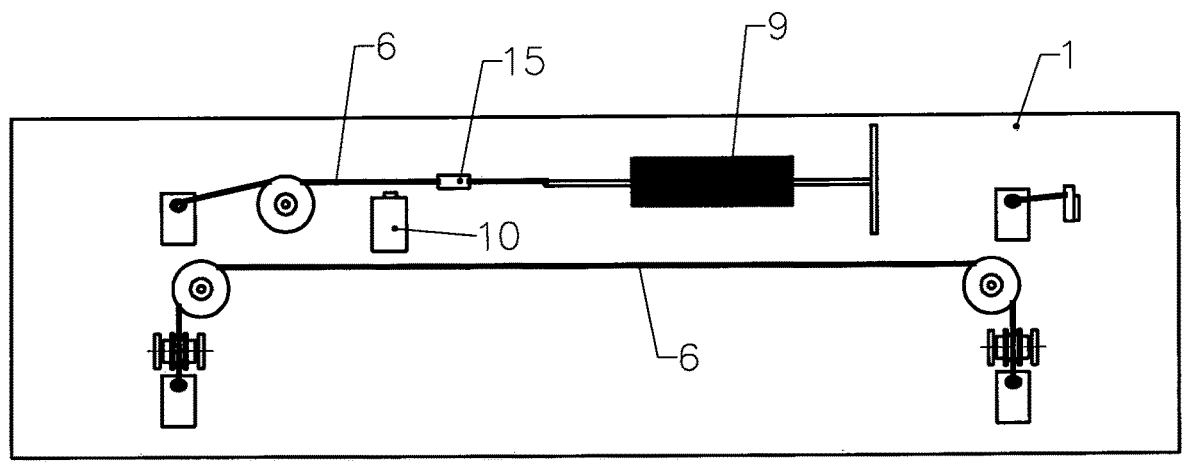
FIG. 6 shows a rear view of the base with a mechanism for activating a vehicle stopping sensor according to the embodiment shown in FIG. 5, after a collision with an obstacle.

Another embodiment of the mechanism for activating sensor 10 of the vehicle stopping system mounted on base 1 is shown in FIG. 5 and FIG. 6. In this embodiment, the mechanism for activating sensor 10 is made in the form of signal element 15 mounted on flexible element 6. When the protection device is in operational state, signal element 15 is placed opposite to sensor 10.

The protection device operates as follows.

When the protection device is installed, flexible element 6 is driven through struts 3 and barrier 2 to rest on guide pulleys 11, whereafter it is tensioned and fixed with fastening elements 12 to base 1. Therewith, the signal elements of sensor 10 in any embodiment of the mechanism for activating the sensor of the vehicle stopping system are installed opposite to sensor 10. At a collision of the protection device with an obstacle, for example, with a human, barrier 2 is displaced and rod-like elements 4 of at least one strut 3 disengage from detachable joints 5 and disconnect, causing struts 3 lose their structural integrity. With such a design of the protection device, the above sequence occurs both at frontal impact and lateral load. When one or several struts 3 are destroyed, flexible cord 6 gets displaced under the action of spring 9, signal element 14 or 15 loses interaction with the sensing element of sensor 10 and sends a signal to the braking system. The vehicle stops.

Restoring the vehicle protection system to working state, as a rule, requires no replacement of system parts. All it takes is bringing rod-shaped elements 4 of struts 3 into interaction in detachable joints and setting flexible element 6 to the working position.

INDUSTRIAL APPLICABILITY

The protection device is best suited for vehicles that move at a relatively low speed. Herein, it is important that the braking systems of such vehicles provide a short braking path. Said device is best suited for agricultural vehicles. It can serve both for providing human safety and protecting agricultural machinery from damage in collisions with obstacles.

The invention claimed is:

1. A vehicle protection device, including a base and a barrier located in front of the base and connected to the latter by at least two struts attached at one end to the barrier and at another end to the base; wherein, each of said struts is made of at least two separate rod-shaped elements having holes along their longitudinal axes and detachable joints at their ends, and configured to stay connected with each other by force of a flexible element going through the holes of all rod-shaped elements of the struts and capable of disengaging from each other under axial or lateral load; wherein said flexible element is adapted to interact with a base-mounted mechanism for activating a she sensor of a vehicle stopping system.

2. The protection device as of claim 1, wherein the base comprises a towing hitch.

3. The protection device as of claim 1, wherein the detachable joint is pivot-hinged.

4. The protection device as of claim 1, wherein two struts are situated in the same plane; with an upper strut of the two struts attached on one side to an upper part of the barrier and on another side to an upper part of the base.

5. The protection device as of claim 1, wherein the barrier is situated below planes, in which points of attachment of said struts to base are situated.

6. The protection device as of claim 1, wherein the flexible element is made in the form of a cable.

7. The protection device as of claim 1, wherein the flexible element is made in the form of a cord.

8. The protection device as of claim 1, wherein its mounting on a vehicle is enabled.

* * * * *